(12) United States Patent
Martena

(10) Patent No.: US 11,738,495 B2
(45) Date of Patent: Aug. 29, 2023

(54) APPARATUS AND METHOD FOR AUTOMATICALLY ANALYZING EXTRUDED FILMS

(71) Applicant: ELECTRONIC SYSTEMS S.P.A., Momo Novara (IT)

(72) Inventor: Florinda Martena, Momo Novara (IT)

(73) Assignee: ELECTRONIC SYSTEMS S.P.A., Momo Novara (IT)

( * ) Notice: Subject to any disclaimer, the term of this patent is extended or adjusted under 35 U.S.C. 154(b) by 258 days.

(21) Appl. No.: 16/917,100

(22) Filed: Jun. 30, 2020

(65) Prior Publication Data

US 2020/0353665 A1 Nov. 12, 2020

Related U.S. Application Data

(62) Division of application No. 14/911,796, filed as application No. PCT/EP2014/067359 on Aug. 13, 2014, now abandoned.

(Continued)

(30) Foreign Application Priority Data

Aug. 14, 2013 (EP) ..................................... 13180387

(51) Int. Cl.
*B29C 48/92* (2019.01)
*B29C 48/08* (2019.01)
(Continued)

(52) U.S. Cl.
CPC .......... *B29C 48/92* (2019.02); *B29C 48/0023* (2019.02); *B29C 48/08* (2019.02);
(Continued)

(58) Field of Classification Search
CPC ........... B29C 2948/92133; B29C 2948/92628; B29C 48/0023; B29C 48/08; B29C 48/12;
(Continued)

(56) References Cited

U.S. PATENT DOCUMENTS 3,307,215 A  3/1967  Gerhard et al.
3,485,907 A  12/1969  Quackenbush et al.
(Continued)

FOREIGN PATENT DOCUMENTS

DE  102004039497  12/2005
EP  0035356  9/1981
(Continued)

OTHER PUBLICATIONS

International Search Report and Written Opinion, Form PCT/ISA/220, International Application No. PCT/EP2014/067359, p. 1-12, dated Nov. 17, 2014.
(Continued)

*Primary Examiner* — Nahida Sultana
(74) *Attorney, Agent, or Firm* — George McGuire

(57) ABSTRACT

The invention relates to an apparatus for automatically analyzing extruded films, in particular stretched films, wherein a neck-in portion is formed at each of both edges of the film at a specific distance from an extrusion lip of a film extruder along the longitudinal transport direction of the film, and a respective method. The apparatus comprises two edge detectors being arranged along a first line substantially transversal to the longitudinal direction and being spaced from each other by a specific distance, wherein each one edge detector is configured to detect, preferably to continuously detect the lateral position of one respective edge of the neck-in portion of the film, a calculation means for determining the spatial relation between at least one lateral position at the extrusion lip and a respective lateral position
(Continued)

at the neck-in portion on the basis of the two lateral positions of the edges of the neck-in portion of the film.

5 Claims, 7 Drawing Sheets

Related U.S. Application Data

(60) Provisional application No. 61/865,673, filed on Aug. 14, 2013.

(51) Int. Cl.
  *B29C 48/00* (2019.01)
  *B29C 48/31* (2019.01)
  *B29C 48/30* (2019.01)
  *B29C 48/88* (2019.01)
  *B29L 7/00* (2006.01)

(52) U.S. Cl.
  CPC ............ *B29C 48/30* (2019.02); *B29C 48/313* (2019.02); *B29C 48/914* (2019.02); *B29C 2948/92133* (2019.02); *B29C 2948/92152* (2019.02); *B29C 2948/92447* (2019.02); *B29C 2948/92628* (2019.02); *B29C 2948/92647* (2019.02); *B29C 2948/92904* (2019.02); *B29L 2007/008* (2013.01)

(58) Field of Classification Search
  CPC ... B29C 48/313; B29C 48/914; B29C 48/917; B29C 48/92
  See application file for complete search history.

(56) References Cited

U.S. PATENT DOCUMENTS

| | | | |
|---|---|---|---|
| 3,930,922 A | | 1/1976 | Donoghue et al. |
| 4,000,402 A | | 12/1976 | Higham |
| 4,255,365 A | | 3/1981 | Heyer |
| 4,409,160 A | | 10/1983 | Kogo et al. |
| 4,904,318 A | * | 2/1990 | Goto ................. B32B 38/18 264/40.1 |
| 4,954,719 A | | 9/1990 | Harris |
| 5,320,787 A | * | 6/1994 | Hayashi ............. B29D 17/007 264/237 |
| 5,411,695 A | | 5/1995 | Yamada et al. |
| 2002/0175434 A1 | | 11/2002 | Uehara et al. |
| 2009/0017711 A1 | | 1/2009 | Dilo |
| 2009/0243133 A1 | | 10/2009 | Wong et al. |
| 2022/0412724 A1 | * | 12/2022 | Paulus ................. G01S 17/08 |

FOREIGN PATENT DOCUMENTS

| | | |
|---|---|---|
| EP | 0607938 | 7/1994 |
| EP | 2014813 | 1/2009 |
| JP | H04187417 | 7/1992 |
| JP | H0788934 A | 4/1995 |
| JP | H1177805 | 3/1999 |
| JP | H1177805 A | 3/1999 |
| JP | 2000171218 | 6/2000 |
| JP | 2002172679 | 6/2002 |
| JP | 2002172679 A | 6/2002 |
| JP | 2010167584 | 8/2010 |
| JP | 2010167584 A | 8/2010 |
| WO | 1988009912 | 12/1988 |

OTHER PUBLICATIONS

EP Office Communication, dated Jun. 25, 2021. pp. 1-4.
EP Communication, dated May 2, 2022. pp. 1-5.

* cited by examiner

APPARATUS AND METHOD FOR AUTOMATICALLY ANALYZING EXTRUDED FILMS

REFERENCE TO RELATED APPLICATION

This application is Divisional of U.S. Non-Provisional application Ser. No. 14/911,796, filed Feb. 12, 2016 which is a U.S. National Phase filing of International Application No. PCT/EP2014/067359, filed Aug. 13, 2014, which claims priority to U.S. Provisional Application No. 61/865,673, filed Aug. 14, 2013, and claims priority to European Application No. 13180387.6, filed Aug. 14, 2013, the entirety of each of which are hereby incorporated by reference in their entirety.

The present invention relates to an apparatus and a method for automatically analyzing extruded films, in particular stretched films, as well as to a system and method for automatically controlling a film extruder for manufacturing the extruded films.

EP 0 607 938 A1 relates to a method and apparatus comprising two magnetic sensors and one laser meter for measuring the thickness of a film which is manufactured by using a film extruder. More specifically, the apparatus comprises a scanning head that measures the thickness of the material combining the signal of an inductive sensor and a laser sensor. By using a calibration technique, the thickness of a film can be measured with high accuracy.

EP 0 035 356 A1 relates to a method and apparatus for controlling the thickness of an extruded, biaxially elongated film product. At first, the extruded film is elongated in a longitudinal direction, whereby the width becomes smaller. Then the film is elongated in a lateral direction, whereby the width becomes wider than in the extruded state. In this method, a correlation between positions along the widthwise direction of a film sheet and positions of die manipulation bolts of an extrusion die is obtained. Initially, a profile of the film sheet prior to lateral elongation is converged into a tolerable range. Thereafter, the thickness of the film sheet after lateral elongation is measured and if there are thickness deviations outside the tolerable range, thickness regulation is effected by transmitting a signal corresponding to the thickness deviations to appropriate ones of the die manipulation bolts. The correlation between positions along the widthwise direction of the film product and positions of the manipulation bolts is obtained by determining a distance from an edge on the longitudinally elongated sheet and an edge along the laterally elongated sheet. This correlation result is then used for determining which one of the manipulation bolts are adjusted. As an alternative to the profile control of the sheet prior to lateral elongation, a distribution along the widthwise direction of the thickness of the sheet prior to longitudinal elongation could be measured in place of the measurement of the distribution along the widthwise direction of the thickness of the sheet prior to lateral elongation.

U.S. Pat. No. 5,411,695 relates to a method for producing a thermoplastic resin film. It particularly deals with the bowing phenomenon which occurs in the process of transverse drawing of the thermoplastic resin film. According to this document, the bowing phenomenon can be visualized by drawing straight lines on the surface of the film in the direction of transport. The bowing phenomenon can be reduced by not only considering manufacturing processes and apparatus but also by consideration of the characteristics of the film itself and by applying specific cooling in a cooling zone followed by heat setting of the film.

WO 1988/009912 A1 relates to a gauge for measuring the thickness of a film moving along a path. According to an embodiment, the gauge comprises two heads mounted on vertical supports arranged on opposite sides of the path along which plastics film material is led from an extruder in a generally horizontal plane. Each head is rotatably mounted about a vertical axis and comprises a first plate and a plurality of second plates being spaced apart from the first plate to form a slot through which the film whose thickness is to be measured may be passed as said film travels along a path. Said first plate and said second plate constitute a plurality of capacitors wherein the capacitance of said capacitors is measured to obtain the thickness of the film moving along the path.

The present invention aims to provide an apparatus and a method for automatically analyzing extruded films, in particular stretched films. It is a further object of the present invention to provide a system and a method for automatically controlling a film extruder, in particular for automatically controlling the thickness of extruded films.

These objects are achieved with the features of the independent claims. The dependent claims relate to further aspects of the present invention.

The present invention is based on a general concept of continuous real time measurement of the width of the material at a neck-in portion which is formed at each of both edges of the film at a specific distance from an extrusion lip of a film extruder along the longitudinal transport direction of the film. Preferably, the width of the material is measured at the position of a scanning measuring head sensor. The information regarding the width is used for determining the mapping of the neck-in portion. According to the present invention, the width is continuously measured in real time.

Up to now, known systems using a scanning measuring head sensor detect the position of one film edge at a specific time. During the scanning process, the edge is detected as a sudden thickness change. This method has the limit to detect only one edge per time and the edge's position is determined only once during a scanning cycle, i.e. at the end of the scanning path. The inventors found that in the meantime, the film contraction may change, especially during the process transitions and in presence of oscillating station being arranged in the transporting direction of the film before the bobbin where the film is wound on. Therefore, any mark, for example a wax mark or a mark created by a forced lip of an extrusion lip of the film extruder, are not sufficient to identify the correspondence between a certain part of the film along the measurement line at the neck-in portion and the corresponding position along the extrusion lip of the film extruder. According to the present invention, the positions of both edges are continuously detected and on the basis of the detected positions of the edges, the width along the neck-in portion is determined.

According to an aspect of the present invention an apparatus for automatically analyzing extruded films, in particular stretched films, wherein a neck-in portion is formed at each of both edges of the film at a specific distance from an extrusion lip of a film extruder along the longitudinal transport direction of film comprises two edge detectors. The two edge detectors are arranged along a first line substantially transversal to the longitudinal direction and being spaced from each other by a specific distance. Each edge detector is configured to detect, preferably to continuously detect the lateral position of one respective edge of the neck-in portion of the film. The apparatus further comprises a calculation means for determining the spatial relation between at least one lateral position at the extrusion lip and a respective lateral position at the neck-in portion on the basis of the two lateral positions of the edges of the neck-in portion of the film.

According to a further aspect of the present invention the calculation means determines the width of the film along the first line on the basis of the two lateral positions of the edges of the neck-in portion of the film. Furthermore, the calculation means determines the spatial relation between the at least lateral position at the extrusion lip and the respective lateral position at the neck-in portion on the basis of the width of the film along the first line preferably taking into account a width of an opening of the extrusion lip.

According to a further aspect of the present invention the apparatus comprises storage means for storing at least one functional relationship, preferably an equation defining a relationship between at least one lateral position at the extrusion lip and a respective lateral position at the neck-in portion for a reference film having a specific width and thickness at the extrusion lip, wherein preferably the functional relationship is defined for a specific material of the extruded film. The calculation means corrects the functional relationship on the basis of the two lateral positions of the edges of the neck-in portion of the film or on the basis of the width of the film and wherein the calculation means is further configured to determine the spatial relation between at least one lateral position at the extrusion lip and a respective lateral position at the neck-in portion using the corrected functional relationship.

According to further aspects of the present invention the edge detector may comprise optical, capacitive, inductive or acoustical sensors. Preferably the sensors are arranged in an array form, preferably along a linear array of specific length wherein the linear array is arranged substantially parallel to the first line. The specific length of the linear array is in the range of 5 to 100 cm, preferably 10 to 50 cm. In addition or alternatively the edge detectors perform a one side measurement by using reflection or a two-side measurement by using transmission. Depending on which type of material is used, one or several of the mentioned sensor types can be used. For example when the material of the extruded film is black or only partly light-transmissive optical sensors can be used in particular photocells can be used. Where then when the material of the extruded film is transparent a capacitive measurement can be preferred. Alternatively, inductive sensors can be used. Acoustical sensors, in particular those using ultrasound can be used either in a two-side measurement by using transmission as well as in a one-side measurement by using reflection. Other type of measurements using different ranges of signal frequency for example using micro-waves may be alternatively used for edge detection of an extruded film.

According to another aspect of the present invention the apparatus comprises at least one component for creating at least one mark on the extruded film preferably at at least one lateral position at the extrusion lip in the border region on both lateral sides of the film. The apparatus further comprises at least one component for detecting the lateral position of the mark at the neck-in portion.

Such a mark may be created by using a wax pen, wherein the wax mark preferably of a specific color different from the color of the film can be detected with an optical camera positioned at the neck-in portion, i.e. the component for detecting the lateral position of the mark at the neck-in portion according to one aspect of the present invention comprises a sensor, preferably an optical camera, configured to detect the substance at the neck-in portion. Alternatively it is possible to create a mark using a spray nozzle containing a substance preferably a liquid or paste-like material more preferably an ink or a resin which is directed to the surface of the film to create a mark which is visible or invisible (e.g. fluorescent ink) to the human eye. As a further alternative the mark can be created by intentionally changing the thickness at a certain position of the extruded film by changing the width at a certain position of the extrusion lip of the film extruder, by a forced lip. In that case the lateral position of the mark can be detected by using a thickness measurement at the neck-in portion.

According to the present invention at least one nozzle means is provided adjacent to the extrusion lip of the film extruder. Preferably, the nozzle means is configured to be movable in a scanning manner in parallel to the extrusion lip of the film extruder along the width of the extruded film or web. Preferably the position of each nozzle means has a specific known relationship with one or several adjusting means for example with one or several bolts with which the extrusion lip of the film extruder can be specifically controlled at respective positions along the width of the extrusion lip.

According to an aspect of the present invention an array of a plurality of nozzle means is used, wherein the array is preferably a linear array which is oriented in parallel to the extrusion lip of the film extruder. According to another aspect of the invention the individual nozzle means are arranged at predetermined distances from each other and more preferably at equal distances from each other, preferably equivalent to the width of adjusting means like bolts of a film extruder or a multiple of the bolts.

According to an aspect of the present invention the component for creating at least one mark comprises one or more nozzle means for directing a gas stream, preferably an air stream to a surface of the film which exits the extrusion lip of the film extruder. The nozzle means are configured and arranged in such a manner that the gas stream locally causes a cooling of the extruded film. As a result the part of the film being cooled by the gas jet has a predetermined dimension, preferably a predetermined diameter or predetermined width and length. In this way local marks can be created for example dot like marks or linear marks, wherein preferably several adjacent marks are created which are laterally spaced to each other.

According to another aspect of the present invention the component for creating at least one mark comprises at least one nozzle means for directing a substance, preferably a liquid or paste-like material, more preferably an ink or resin and more preferably fluorescent ink to a surface of the film exiting the extrusion lip of the film extruder, wherein the nozzle means are configured and arranged in such a manner that the substance creates a local mark on the extruded film. Alternatively, it is possible to combine the gas nozzle means and the substance nozzle means to create a local mark by cooling and/or a mark by the substance. This might be done through a combined nozzle means configured to selectively apply gas and/or a substance to the film surface or by two separate nozzle means located next to each other one for applying gas and the other one for applying a substance.

Preferably an apparatus and a method for providing marks on extruded films is used as disclosed and claimed in the co-pending patent application of the present applicant the title "apparatus and method for providing marks on extruded films".

According to a further aspect of the present invention the apparatus comprises means for receiving thickness information of the film along a second line, wherein the second line is substantially parallel to the first line. The second line may be at the same position as the first line or at the position spaced apart from the first line preferably downstream in the longitudinal transport direction. The calculating means are configured to generate control signals for controlling respective adjusting means of the extruder on the basis of the thickness information and a) the two lateral positions of the edges of the neck-in portion of the film and/or b) the width of the neck-in portion of the film and/or c) the information of the lateral position of the mark. In this way the width of respective portions of the extrusion lip of the extruder can be individually adjusted by controlling one or several or all adjusting means.

According to another aspect of the present invention a frame is arranged substantially along the first line. The frame is configured to support the two edge detectors. Furthermore, the frame is preferably configured to support a gauging instrument for measuring the thickness of the film over its whole width. And it preferred embodiment the frame comprises guiding means along which the gauging instrument is movable in move directions such that the gauging instrument is capable to measure the thickness of the film across the whole width of the film during each scanning circle.

A further aspect of the present invention relates to a system for automatically controlling the film extruder in particular for automatically controlling the thickness of extruded films, in particular of stretched films. The system comprises an apparatus for automatically analyzing extruded films as described above. And furthermore it comprises control means for controlling individual adjusting means for adjusting the local width of the film extruder on the basis of the analysis of the extruded film.

Another aspect of the present invention relates to a method for automatically analyzing extruded films, in particular stretched films, wherein a neck-in portion is formed at each of both edges of the film at a specific distance from an extrusion lip of a film extruder along the longitudinal transport direction of the film. In this method, preferably an apparatus as described above is used. The method according to this aspect comprises the steps of detecting, preferably continuously detecting the lateral position of one respective edge of the neck-in portion of the film using two edge detectors being arranged along a first line substantially transversal to the longitudinal direction and being spaced from each other by a specific distance. The method further comprises the step of determining the spatial relation between at least one lateral position at the extrusion lip and a respective lateral position at the neck-in portion on the basis of the two lateral positions of the edges of the neck-in portion of the film using a calculation means.

According to a further aspect of the invention, the width of the film is determined along the first line on the basis of the two lateral positions of the edges of the neck-in portion of the film. As a next step, the spatial relation between the at least one lateral position at the extrusion lip and the respective lateral position at the neck-in portion is determined on the basis of the width of the film along the first line. Preferably, a width of an opening of the extrusion lip is taken into account. The width can be determined by subtracting the absolute positions of the two edges along a lateral axis. Alternatively, the width may be determined by using the respective lateral relative positions of the two edges with respect to each corresponding edge detector taking into account a known distance between the two edge detectors.

According to a further aspect of the present invention, the method comprises the step of storing at least one functional relationship. This functional relationship can be defined as an equation which defines a relationship between at least one lateral position at the extrusion lip and a respective lateral position at the neck-in portion for a reference film having a specific width and thickness at the extrusion lip. Preferably, this functional relationship is defined for a specific material of the extruded film. As a further step, the method comprises the correction of the functional relationship on the basis of the two lateral positions of the edges of the neck-in portion of the film or on the basis of the width of the film. By using the corrected functional relationship, the spatial relation between at least one lateral position at the extrusion lip and the respective lateral position at the neck-in portion can be determined.

According to another aspect of the invention, the method comprises the step of creating at least one mark on the extruded film at one respective lateral position at the extrusion lip in the border region of the first and/or second lateral side of the film and the step of detecting the lateral position of the mark at the neck-in portion. The mark can be created as described above with reference to the apparatus.

According to a further aspect of the present invention, the method comprises the step of receiving thickness information of the film along a second line substantially parallel to the first line, wherein the second line is either at the same position of the first line or at a position spaced apart from the first line preferably downstream in the longitudinal transport direction. It further comprises the step of generating control signals for controlling respective adjusting means of the extruder on the basis of the thickness information at the two lateral positions of the edges of the neck-in portion of the film or the width of the neck-in portion of the film.

A further aspect of the present invention relates to a method for automatically controlling a film extruder, in particular for automatically controlling the thickness of extruded films, in particular of stretched films, comprising the steps of automatically analyzing extruded films as described above, and controlling individual adjusting means for adjusting the local width of respective portions of the extrusion lip of the film extruder on the basis of the analysis of the extruded film.

In addition, the apparatus and method as described above allows for auto-mapping of the neck-in portion.

The method and apparatus as claimed and described herein can be used in combination with an apparatus and a method for providing marks on extruded films as described in a co-pending patent application of the same applicant filed on the same day as the present patent application. Therefore, the content of this co-pending patent application with the title: Apparatus and method for providing marks on extruded films is fully incorporated herein by reference.

BRIEF DESCRIPTION OF THE FIGURES

The present invention will now be explained with reference to preferred embodiments and the drawings, in which.

DETAILED DESCRIPTION OF THE INVENTION

Figure 1:
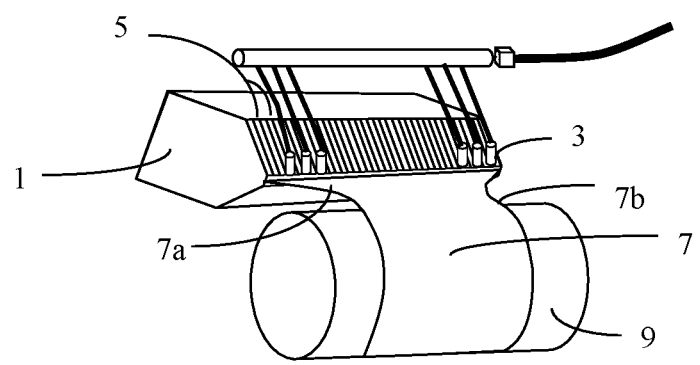
FIG. 1 shows a schematic perspective view of a system for manufacturing films according to an embodiment of the present invention.

FIG. 1 shows a schematic view of a system according to an embodiment of the present invention. FIG. 1 shows a film extruder 1 comprising an elongated extrusion lip 3 and a plurality of adjusting means 5 being arranged adjacent to each other along the width of the extrusion lip. The adjusting means 5 can comprise respective bolts, and the adjusting means can be used for changing the width of the extrusion lip 3 and more specifically wherein individual adjustments can be made to adjust the thickness individually at specific parts of the extrusion lip. FIG. 1 further schematically shows an extruded film 7 which exits the extrusion lip 3 and which is rolled on a chill roll 9. As further schematically shown in FIG. 1 the extruded film has a wider width at the exit of the film extruder which substantially corresponds to the width of the extrusion lip 3. Due to a thermal contraction the width of the extruded film is smaller when reaching the chill roll 9. More specifically, due to this thermal contraction the extruded film comprises on the left lateral side a neck-in portion 7a and on the right lateral side a neck-in portion 7b.

Figure 2:
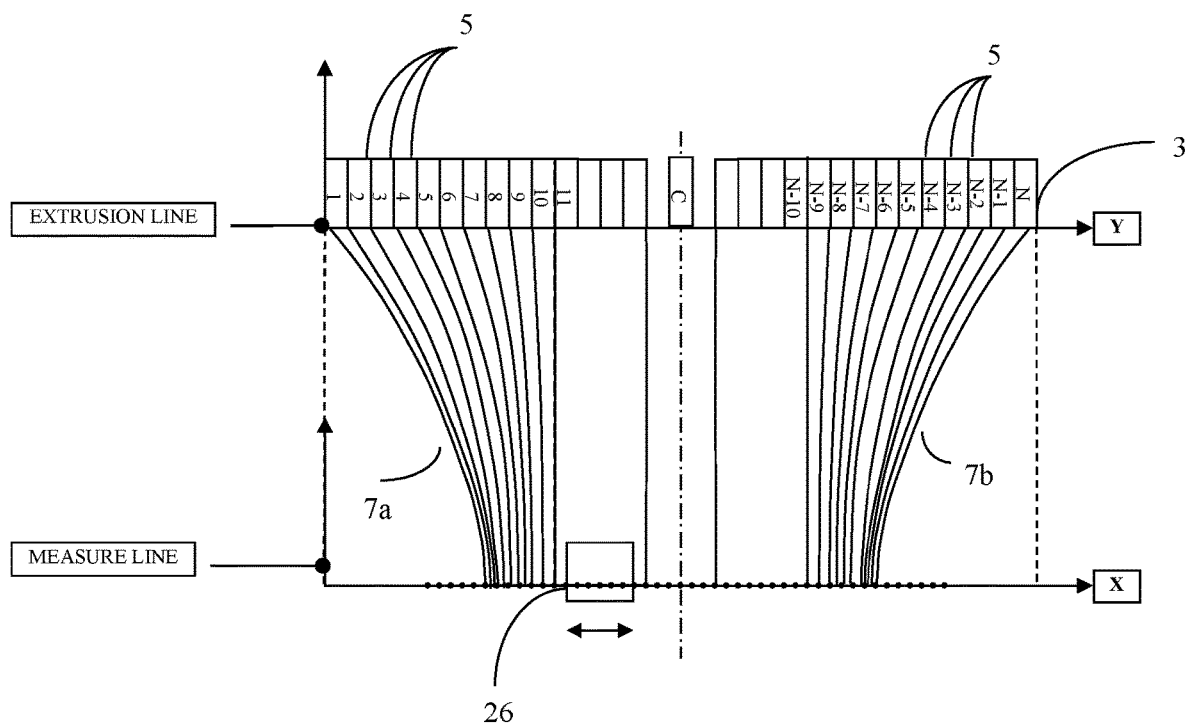
FIG. 2 shows a schematic diagram as a top view on the extruded film in the system of FIG. 1.

FIG. 2 schematically shows a top view of an extruded film coming out from the extrusion lip 3 wherein between the extrusion line Y and a measurement line X a neck-in portion 7a is formed on the left side and a neck-in portion 7b is formed on the right side of the schematic drawing of FIG. 2. FIG. 2 illustrates that the contraction of the film specifically occurs along the border region of a film on both lateral sides. FIG. 2 further shows schematically a number N of adjusting means 5 designated with numbers 1, 2, 3 to 11 and N−10, N−9 to N. In the middle region between the adjusting means 10 to N−9 substantially no thermal contraction occurs. This is again an example. The numbers depend for example on the width of the neck-in area or production and line conditions like viscosity of the material or mechanical dimensions of the production line. The total number of adjusting means N may be in the range of 30 to 350. Therefore, in FIG. 2 both lateral sides are shown in an enlarged manner. As can be seen the width of the film along the extrusion line is wider than the width along the measurement line. As can be further seen there is a specific relation of the position of the part of the film exiting for example the adjustment means 1, i.e. the position along the axis Y and the respective position of this part of the film along the measurement line which corresponds to a position along the axis X. In other words, there is a specific function y=f(x). Those parts which exit the extrusion lip 3 at a particular individual adjusting means 5 can be marked with a wax pen or a specific change of the thickness, for example, by changing the width of a specific part of the extrusion lip. Alternatively, a mark can be created by blowing air to the surface of the film. As disclosed and claimed in the above-mentioned co-pending patent application, by using an array of air blows located above the adjusting means, i.e. the bolts on both lateral sides of the film extruder, local film cooling can be caused. The air flow can be simultaneously or individually be directed to the surface of the film such that the film coming out of the extrusion lip 3 is cooled and as a consequence a mark is created on the film having a specific thickness.

By using a measurement sensor head 21 along the measurement line X the thickness can be measured and the marks can be detected. This measurement sensor head can move back and forth along the measurement line X to measure the thickness of the film over its whole width. For example, a second frame (not shown) may be arranged above the measurement line X along which the measurement sensor head traverses.

Figure 3:
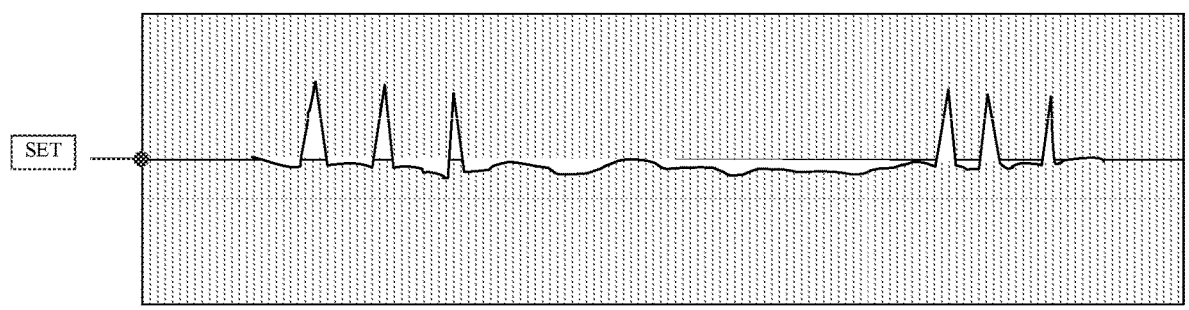
FIG. 3 shows a schematic diagram of the measurement result representing the thickness variation resulting from marks created on an extruded film.

As schematically shown in FIG. 3, the film thickness profile comprises three peaks on both sides wherein one peak corresponds to a respective mark detected by the measurement sensor head 26 (28). The thickness peaks schematically shown in FIG. 3 correspond to linear marks created on respective parts of the film when exiting the extrusion lip. More specifically these marks correspond to respective adjusting means 5 where a nozzle 11 directs a gas stream on the surface of the extruded film.

These data can be processed to adjust the function y=f(x) in a way that gives more accuracy in the characterization of the real film contraction. The air blow marking cycle can be initiated manually or automatically. The air blow marking can be used continuously or in the case of events which are significant on the manufacturing of the extruded film in particular significant on the neck-in effect. For example, in case of a change of production, a change of the width of the film, a change of the distance between the dye and the chill roll and a change of vacuum box conditions the air blow marking cycle can be initiated.

Figure 4:
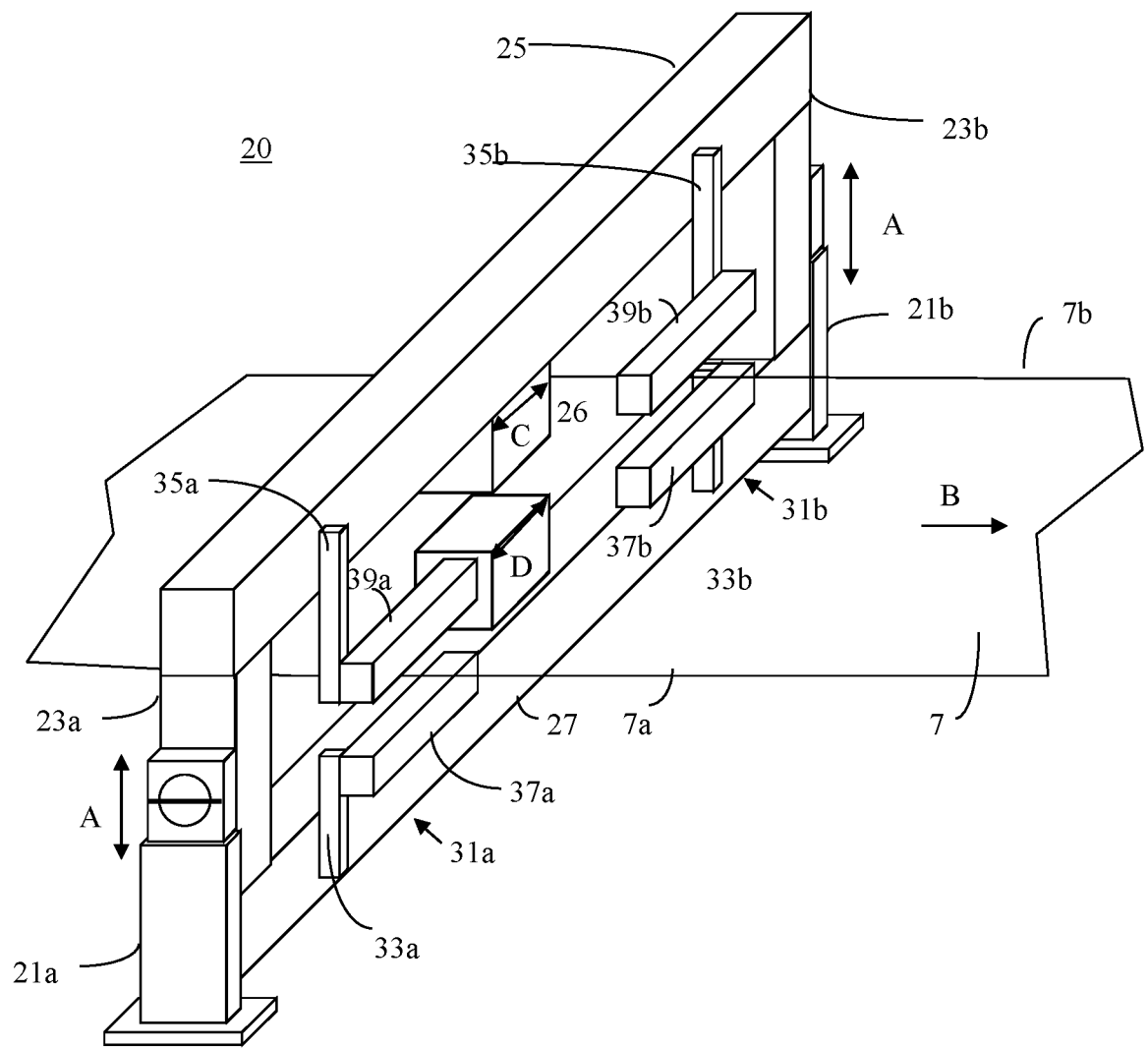
FIG. 4 shows a schematic perspective view of an apparatus for automatically analyzing extruded films according to an embodiment of the present invention.

FIG. 4 shows a schematic perspective view of an apparatus for automatically analyzing extruded films according to an embodiment of the present invention. The apparatus as shown in FIG. 4 is generally designated with reference numeral 20. It comprises a rectangular frame being supported onto column-like stands, i.e., a first column 21a on the left side (as seen in FIG. 4) and a second column 21b on the right side of the frame. As schematically shown by arrows A, the vertical position of the frame can be adjusted in height. The frame comprises a first side beam 23a on the left side and a second side beam 23b on the right side. The frame further comprises an upper beam 25 connecting the top ends of the two side beams 23a, 23b. The frame further comprises a lower beam 27 connecting the lower ends of the two side beams 23a, 23b. The apparatus as schematically shown in FIG. 4 further comprises a first edge detector 31a on the left side and a second edge detector 31b on the right side, as shown in FIG. 4. The edge detectors are configured to perform a two-side measurement by using transmission of light. The first edge detector 31a comprises a lower connecting beam 33a preferably an upright stand for supporting a lower array of optical transmitters 37a. The lower end of the lower connecting beam 33a is connected to one side surface of the lower beam 27 of the frame. As can be seen from FIG. 4, the lower stand 33a is positioned in the neighbourhood of the first side beam 23a. At the upper end of the lower connecting beam 33a, one end of the lower array of edge detectors 37a is attached. The lower array of optical transmitters 37a extends in the direction of the second edge detector 31b. The lower array of optical transmitters 37a is substantially in parallel relationship to the lower 27 and the upper beam 25 of the frame. The first edge detector 31a further comprises an upper connecting beam 35a preferably a hanging rod being attached with one end to a side surface of the upper beam 25. The lower end of the upper connecting beam supports an upper array of optical sensors 39a. One end of the upper array of optical sensors 39a is connected to the lower end of the upper connecting beam 35a. The arrangement of the lower array of optical transmitters 37a and the upper array of optical sensors 39a including their respective connecting beams 33a and 35a has a mirror-like relationship with respect to a horizontal plane going through the frame parallel to its lower and upper beam.

The second edge detector 31b on the right-hand side of the frame similarly comprises a lower connecting beam 33b for supporting a lower array of optical transmitters 37b and an upper connecting beam 35b for supporting an upper array of optical sensors 39b. The lower and the upper array of optical transmitters/sensors 37b, 39b including their respective connecting beams 33b and 35b are also arranged in a mirror-like relationship with respect to said horizontal surface which goes through the frame. Both edge detectors 31a on the left side and 31b on the right side are arranged with respect to each other in a mirror-like relationship with respect to a vertical surface going through the frame perpendicular to its lower and upper beam.

As further shown in FIG. 4, an extruded film 7 is guided through a slit-like region present between the lower and the upper arrays of optical transmitters/sensors with a moving direction indicated with the letter "B". The first edge 7a of the film shown on the left side of FIG. 4 is positioned between the lower array of optical transmitters 37a and the upper array of optical sensors 39a of the first edge detector 31a. The lateral position of the first edge 7a is positioned between both lateral ends of the lower and the upper array 37a, 39a in such a manner, that the edge detector can detect the lateral position of the edge. Similarly, the second edge 7b of the film 7 on the right side of FIG. 4 is positioned between the lower and the upper array of optical transmitters/sensors 37b and 39b of the second edge detector 31b.

The apparatus as schematically shown in FIG. 4 further comprises a first gauging instrument 26 being supported by the upper beam 25 of the frame. This gauging instrument is movable back and forth in the direction indicated with the letter "C" which is perpendicular to the moving direction "B". In this embodiment, the apparatus comprises a second gauging instrument 28 being supported by the frame. The second gauging instrument is movable back and forth in the same direction as the first gauging instrument but independently from each other. Therefore, the moving direction is indicated with the letter "D".

When manufacturing a film with a film extruder, the film can be analyzed by using the apparatus as shown in FIG. 4. This apparatus can be arranged along the axis "X" as shown in FIG. 2. During the manufacturing process, the film is transported in the direction as indicated by the letter "B" in FIG. 4. During the production of the film, the two edge detectors 31a and 31b continuously determine the position of the respective edges 7a and 7b of the films 7. At the same time, the two gauging instruments 26 and 28 are measuring the thickness over the whole width of the film.

Thus, the mechanical frame supports the thickness measurement head and the two edge detectors for continuously measuring the positions of the edges. As the position of the edges is monitored in a continuous manner, it is possible to detect the absolute position of a mark which is created on the extruded film when exiting the extrusion lip of the film extruder. The detection of the mark on the one hand and the continuous monitoring of the position of the edges on the other hand has the advantage that a perfect adjustment of a relationship between a lateral position at the extrusion lip and a respective lateral position at the neck-in portion of the extruded film can be determined. More specifically, a functional relationship like the function f(x) can be adjusted in a perfect manner to changes of surrounding conditions. In particular, it can take into account the neck-in changes as function of time, because of the following parameters: line set-up, process conditions, environmental drifts, temperature changes that affect the elongational viscosity of the polymer and production changes.

Instead of, or optionally in addition, to marking by a wax pen or a gas nozzle as described above it is possible to create a mark using a spray nozzle situated above and/or below the film at the extrusion lip. In this embodiment, a substance preferably a liquid or paste-like material more preferably an ink or a resin is directed to the surface of the film to create a mark which is visible or invisible to the human eye. The mark is positioned in a defined relationship with respect to a specific part of the extrusion lip. In the following, ink is used from the list of substances as to describe the embodiment by example. The ink can be of any material and/or color to create a mark on the extruded film which can be detected by an appropriate sensor, e.g. an optical camera or other non-contact type sensors like beta ray, x-ray, infrared sensors or interference type sensors. Preferably, the ink can be a fluorescent ink that is invisible for the human eye on the extruded film. Fluorescent inks particularly suitable might either be UV curable or thermally dried. This has the advantage that the marked part of the extruded film can stay on the extruded film, i.e. it does not have to be cut away in post-processing. The use of an ink spray nozzle is advantageous as there is no contact between the nozzle and the extruded film. Furthermore, the thickness of the film is not changed apart from the thin layer of ink deposited on the film.

Next, the marking by an ink spray nozzle will be described referring to FIG. 5, FIG. 6 and FIG. 7. The description of features which have been described above already will not be repeated. Rather, full reference is made to the above description and the new features of this specific embodiment will be described in detail. According to FIG. 5 the ink with or without fluorescent characteristics will be put into a pressure vessel connected to an air pressure system with a pressure regulating valve in between. An electric valve in the front of the spray nozzle 6 is provided to control the application of ink to the extruded film. The ink spray nozzle 6 is situated in scanning traversing position on a beam that has a mechanical lay out and assembly compatible with the lay out and the assembly of the machinery (extrusion die plus chill roll) where it is mounted on. The ink spray nozzle 6 is supported by a vertical translation to support the installation in narrow spaces. Furthermore, the ink spray nozzle 6 can have different spray angles and different spray volumes and can mark the film with correspondence to any specific part of the extrusion lip or the respective bolt, preferably one of the bolts at the extrusion lip in the border region. FIG. 6 is an illustration showing the marking of the bolt 3 of the extrusion lip (indicated by the thick black line). As can be seen, the mark on the film follows the specific form of the neck-in portion.

Figure 5A:
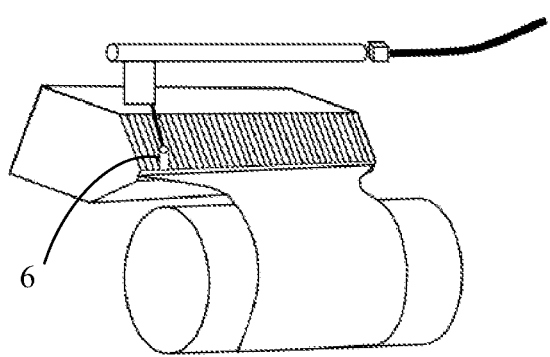
FIG. 5a shows a schematic perspective view of a system for manufacturing films according to another embodiment of the present invention.
Figure 5B:
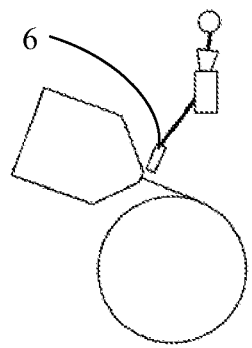
FIG. 5b shows a schematic perspective view of a system for manufacturing films according to another embodiment of the present invention.
Figure 6:
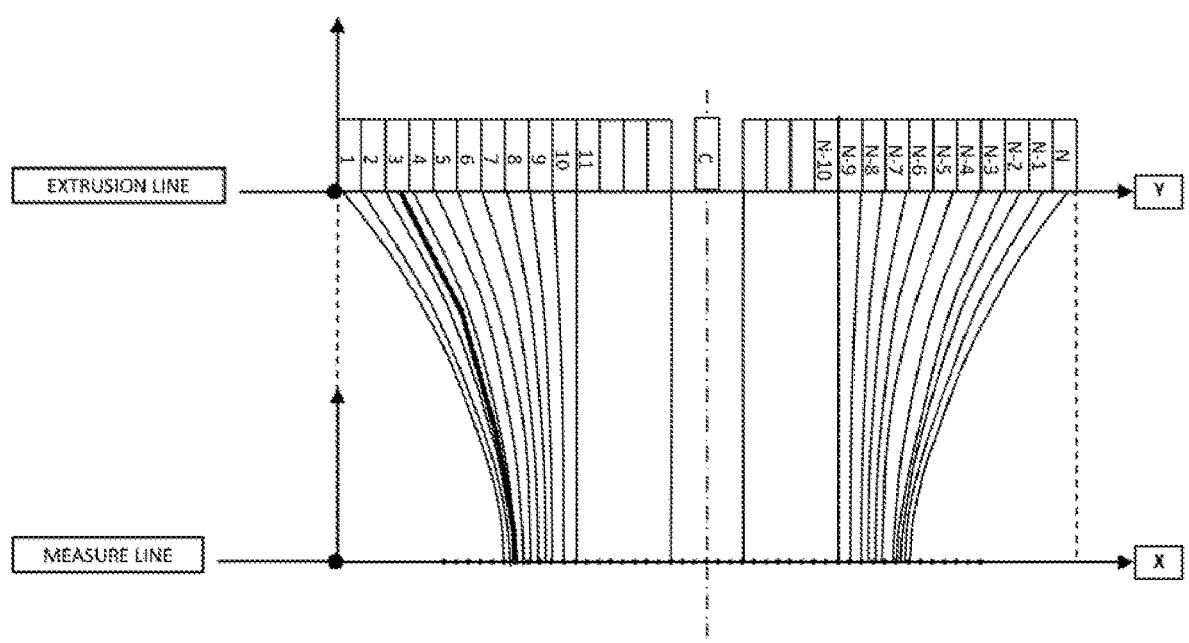
FIG. 6 shows a schematic diagram as a top view on the extruded film in the system of FIG. 5.

Even though the above described marking apparatus according to FIG. 5 has been described by employing one spray nozzle, multiple spray nozzles in one array corresponding to the respective bolts can be employed. Furthermore, it is possible to provide one or two opposite transversal scanning spray nozzles, which, depending on the peculiarity of the products may spray a gas that leaves a mark preferably as a change of thickness that is detected by the thickness measurement system, and/or spraying a substance, for example an ink, that leaves a visible or invisible mark detected by an optical system built-in with the sensor heads of the thickness measurement system.

Figure 7:
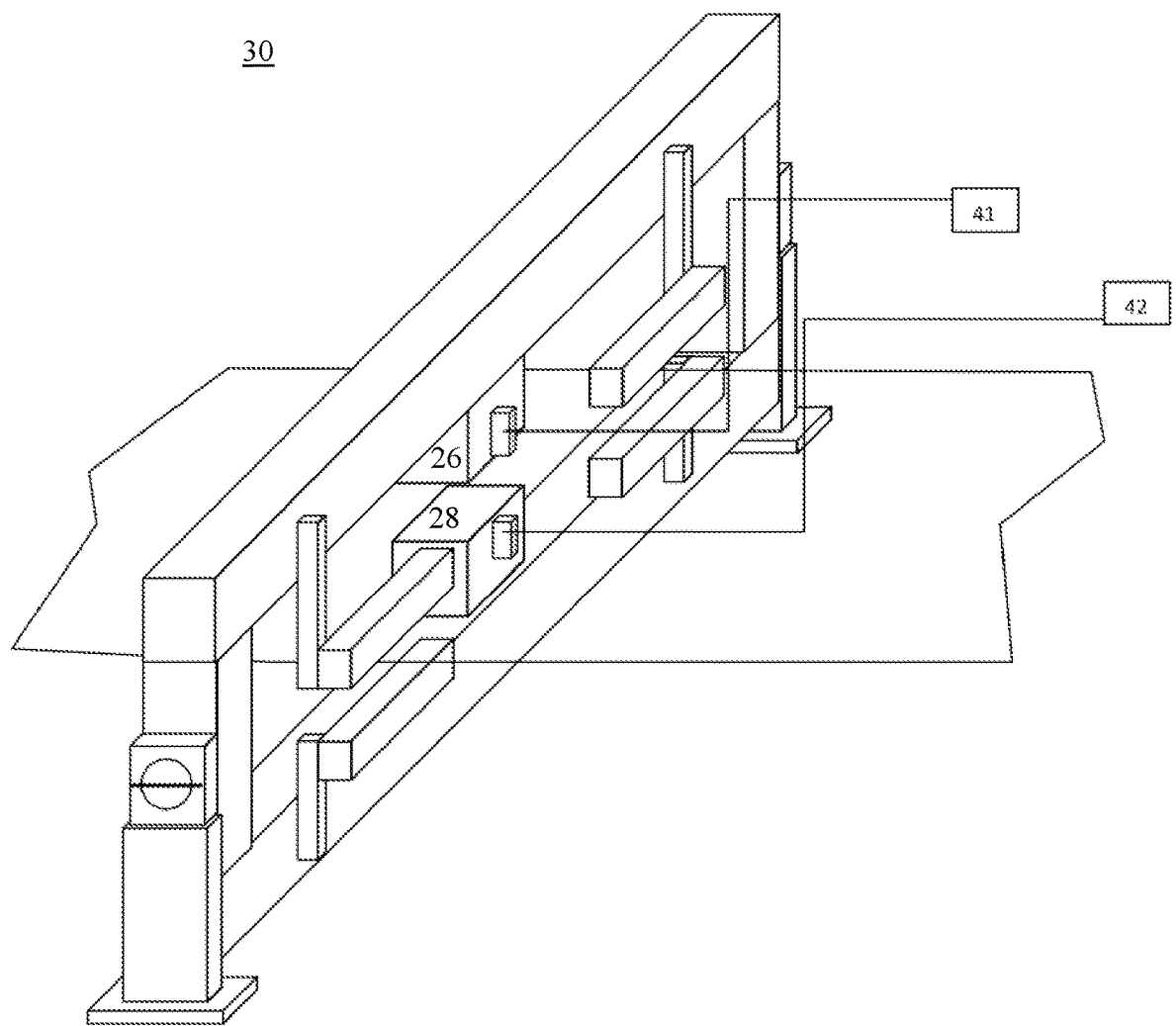
FIG. 7 shows a schematic perspective view of an apparatus for automatically analyzing extruded films according to another embodiment of the present invention.

The detection system 30 according to this embodiment is schematically shown in FIG. 7. The ink is detected by a sensor 41, preferably by an optical camera. Preferably, the optical camera is mounted onto the first measurement sensor head 26 as shown in FIG. 7. The optical camera can be used to detect visible ink. In case fluorescent ink is used to mark the extruded film, an additional light source 42 might be used to make the mark, i.e. the fluorescent ink, visible for detection by an optical camera. Preferably, the light source 42 is mounted onto the second measurement sensor head 28. The source of light 42 can be selected according to the choice of ink used for the specific application and/or the camera system can be selected accordingly. As described above the sensor can be selected to be any suitable sensor to detect the mark on the extruded film and the additional light source 42 is selected according to the sensor used or can be omitted completely.

Again, the track left by the ink spray nozzle 6 on the film allows determining a univocal correlation between the bolt at the extrusion lip and the correspondent material stripe running below the gauge. Using both the information of the location of the mark and the information from the two edge detectors the functional relationship like the function f(x) can be adjusted in a perfect manner, preferably to respond to changes of surrounding conditions as described above.

In film extrusion lines necking-in occurs, i.e., a decrease of materials width when it is stretched. The neck-in effect depends on many parameters like elongational viscosity of the film, production recipe parameters (thickness, polymer type etc.), distance between the die and chill roll, wherein the neck-in is a greater problem, when the distance is greater between the die and chill roll, because the polymer curtain travels more in the air gap without support. With the present invention, detecting, measuring and mapping the neck-in is improved. Thus, detecting, measuring and mapping the contraction of the polymer curtain in the cross-direction during the operation can be efficiently used to correctly control the extrusion die and consequently the thickness of the film.

Due to the thermal contraction and elastic relaxation described as the neck-in effect, the film or sheet produced by cast process is narrower than the die dimensions and tends to thicken at the edges. Any irregularities in the gauge of the film tend to be magnified when it is rolled up. Gauge variations can produce gauge bands in the roll that can cause difficulties in later converting operations. To minimize the problem of gauge bands, sensors are used to monitor the thickness of the web (or film) on-line, using a scanning measuring head that travels across the film so that thickness can be measured along both the length and the width dimensions. The results of thickness measurements are fed back to the die permitting automatic computer-controlled adjustments to be made in the die dimensions to minimize unevenness in the thickness profile. The dies are equipped with flow modifiers such as restrictor bars and adjustable lips, to adjust for processing variations such as changes in resin, extrusion temperature and flow rates. The lip adjustments are computer-controlled and linked to in-line thickness measurements. The present invention allows a correct control of the lip by knowing the correspondence between the band whose gauge has to be adjusted and the lip that creates it. To map such correspondence, the contraction of the film is mapped, i.e., by using the neck-in mapping.

In particular, the present invention has the advantage that disturbances like film shift, change of production, film contraction or shrinkage that effects randomly a negatively the equation solution f(x) are nullified and cancelled by using the continuous, real-time acquisition of the position of the edges. Thus, the present invention allows for auto-mapping of the neck-in portion.

The present invention has now been described with reference to embodiments. The foregoing detailed description and example have been given for clarity of understanding only. No unnecessary limitations are to be understood therefrom. It will be apparent to those skilled in the art that many changes can be made in the embodiments described without departing from the scope of the present invention. In particular, although features and elements of the present invention are described with reference to the aspects in particular combinations, each feature or element can be used alone without the other features and elements of the aspects or in various combinations with or without other features and elements of the invention. Therefore, the scope of the present invention should not be limited to the apparatus, system and methods described herein, but only by the language of the claims and the equivalence of those apparatus, systems and methods.

The invention claimed is:

1. Method for automatically analyzing an extruded film, wherein a neck-in portion is formed at each of both edges of the extruded film at a specific distance from an extrusion lip of a film extruder along a longitudinal transport direction of the extruded film, comprising the following steps:
    detecting a lateral position of one respective edge of the neck-in portion of the extruded film, using two edge detectors being arranged along a first line substantially transversal to the longitudinal direction and being spaced from each other by a specific distance,
    characterized by
    determining the spatial relation between at least one lateral position at the extrusion lip and the respective lateral position at the neck-in portion on the basis of the two lateral positions of the edges of the neck-in portion of the extruded film,
    creating at least one mark on the extruded film at at least one lateral position at the extrusion lip in a border region of a first and/or second lateral side of the extruded film, and
    detecting the at least one lateral position of the at least one mark at the neck-in portion.

2. Method according to claim 1, further comprising the steps of:
    determining a width of the extruded film along the first line on the basis of the two lateral positions of the edges of the neck-in portion of the extruded film, and
    determining the spatial relation between the at least one lateral position at the extrusion lip and the respective lateral position at the neck-in portion on the basis of the width of the extruded film along the first line.

3. Method according to claim 1, further comprising the steps of:
    storing at least one functional relationship, and
    correcting the functional relationship on the basis of the two lateral positions of the edges of the neck-in portion of the extruded film or on the basis of the width of the extruded film and
    determining the spatial relation between at least one lateral position at the extrusion lip and a respective lateral position at the neck-in portion using the corrected functional relationship.

4. Method according to claim 1, further comprising the steps of:
  adjusting the width of respective portions of the extrusion lip of the extruder,
  receiving thickness information of the extruded film along a second line substantially parallel to the first line, and
  generating control signals for controlling respective adjusting means of the extruder on the basis of the thickness information and the two lateral positions of the edges of the neck-in portion of the extruded film or the width of the neck-in portion of the extruded film.

5. A method for automatically controlling a film extruder, comprising the steps of:
  automatically analyzing extruded films according to claim 1, and
  controlling individual adjusting means for adjusting a local width of respective portions of the extrusion lip of the film extruder on the basis of the automatic analysis of the extruded film.

\* \* \* \* \*